United States Patent [19]

Suzuki

[11] Patent Number: 4,538,700
[45] Date of Patent: Sep. 3, 1985

[54] FOUR-WHEEL DRIVE SYSTEM WITH DECELERATION-RESPONSIVE CENTER DIFFERENTIAL CONTROL

[75] Inventor: Kunihiko Suzuki, Sagamihara, Japan

[73] Assignee: Nissan Motor Co., Ltd., Yokohama, Japan

[21] Appl. No.: 589,774

[22] Filed: Mar. 15, 1984

[30] Foreign Application Priority Data

Apr. 1, 1983 [JP] Japan ............................ 58-48337[U]

[51] Int. Cl.³ ............................................. B60K 17/34
[52] U.S. Cl. .................................... 180/248; 180/197;
180/249; 180/250; 74/710.5; 303/100
[58] Field of Search ............... 180/248, 249, 250, 197;
74/710.5

[56] References Cited

U.S. PATENT DOCUMENTS

| 4,070,924 | 1/1978 | Moreno ............................. 74/710.5 |
| 4,075,538 | 2/1978 | Plunkett ......................... 180/197 X |
| 4,320,813 | 3/1982 | Mauua ............................... 180/249 |
| 4,467,886 | 8/1984 | DeClaire ........................... 180/197 |

FOREIGN PATENT DOCUMENTS 0076148 4/1984 European Pat. Off. ............ 180/248

Primary Examiner—Harold W. Weakley
Attorney, Agent, or Firm—Lane, Aitken & Kananen

[57] ABSTRACT

A four-wheel drive system has a center differential between front and rear wheels, and differential restraining or locking means for restraining or locking the center differential. The four-wheel drive system is equipped with an automatic control system for automatically locking the center differential in accordance with the deceleration of the vehicle. The control system may have means for determining a coefficient of friction between the tire and road surface in order to lock the center differential at a low vehicle deceleration when the sensed coefficient of friction is low.

13 Claims, 6 Drawing Figures

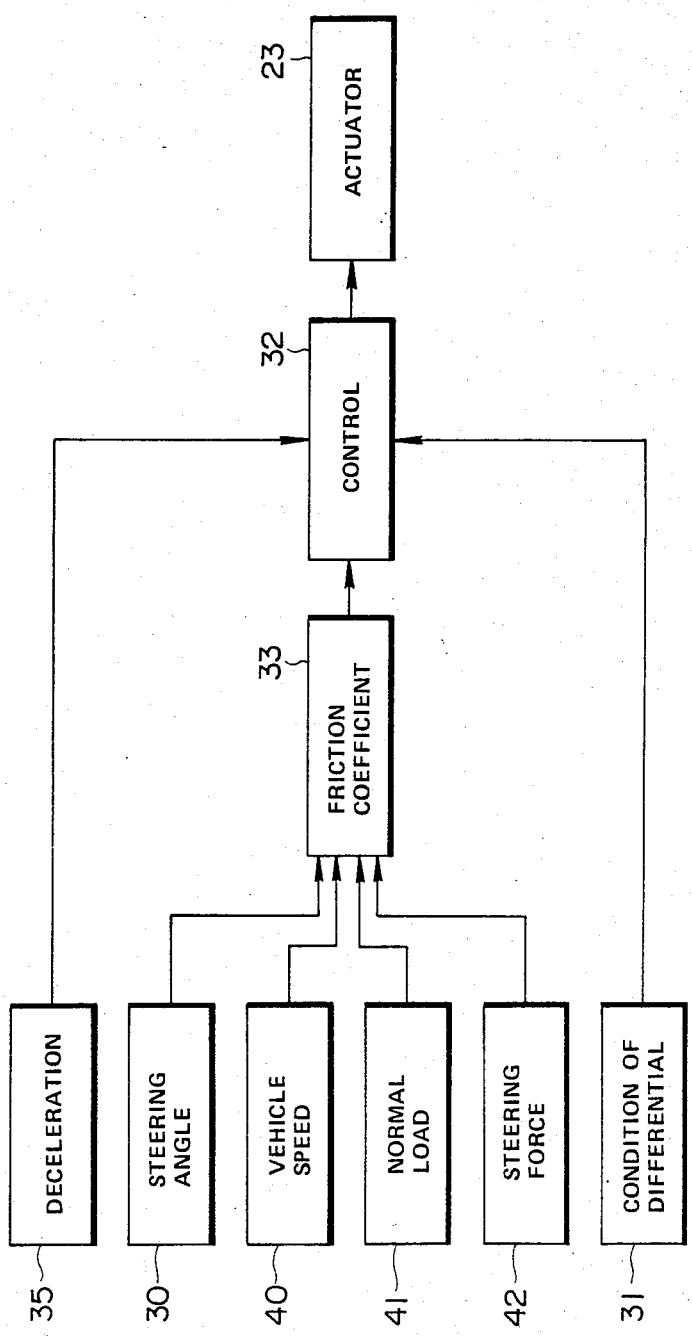

FOUR-WHEEL DRIVE SYSTEM WITH DECELERATION-RESPONSIVE CENTER DIFFERENTIAL CONTROL

BACKGROUND OF THE INVENTION

The present invention relates to a four-wheel drive motor vehicle of a type having a center differential between the front and rear wheels, and means for restraining or locking the center differential. More specifically, the present invention relates to a control system for restraining or locking a center differential of a four-wheel drive system in accordance with the deceleration of the vehicle.

A four-wheel drive vehicle is superior in ability for hill climbing and ability for rough road driving. If, however, all four wheels are always driven at the same speed, a four-wheel drive vehicle cannot be turned smoothly. During a turn with large steering angles of steerable wheels, the front wheel of an inner or outer side must travel along a circle having a large radius and the rear wheel of the same side must travel along a small circle. Because of this difference in turning radius, there arises a large difference between a rotation speed (an average rotation speed, to be exact) of the front wheels and a rotation speed (an average rotation speed) of the rear wheels. As a result, the steering becomes heavy, the tendency to understeer is increased, and the vehicle cannot be turned without abnormal tire friction (called tight corner brake) which tends to brake the vehicle and cause an engine stall.

To overcome these handling and tire friction problems, some four-wheel drive systems use a center differential between front and rear wheels. If, however, one of the four wheels runs on a muddy place, the center differential coacts with a rear or front differential between right and left wheels, so that the torque cannot be transmitted to the other three wheels, and the vehicle cannot escape from the muddy place.

In view of this problem, some four-wheel drive systems are further provided with means (a lockup mechanism or a non-slip differential mechanism) for restraining or preventing the action of the center differential. One example is shown in Japanese patent provisional publication No. 57-114727.

In a four-wheel drive vehicle of this type, when the action of the center differential is prevented by the center differential restraining or preventing means, the front wheels and rear wheels are forced to rotate integrally by the drive system, so that, during hard braking, the front wheels and rear wheels are forced to stop simultaneously. Because of this nature, four-wheel drive vehicles of this type can provide an excellent braking performance. However, the excellent braking performance can be obtained only in a driving mode in which the action of the center differential is prevented. It is very difficult or practically impossible for a driver to change the driving mode manually during hard braking.

SUMMARY OF THE INVENTION

It is an object of the present invention to provide a four-wheel drive vehicle which has a center differential and which can always provide an excellent braking performance by automatically controlling the center differential.

According to the present invention, a four-wheel drive vehicle comprises a four-wheel drive system for transmitting power from the engine to the front wheels and rear wheels, and a control system for controlling the four-wheel drive system. The four-wheel drive system comprises a center differential connected between the front wheels and the rear wheels, and differential restraining means capable of bringing the center differential into a restrained condition in which the action of the center differential is restrained. The control system comprises deceleration sensing means for sensing the deceleration of the vehicle, and condition sensing means for detecting whether the center differential is in or out of the restrained condition. The control system further comprises control means for controlling the center differential by actuating the differential restraining means in accordance with signals of the decelerating and condition sensing means. The control means is arranged to actuate the differential restraining means to bring the center differential into the restrained condition if the sensed deceleration is equal to or higher than a predetermined value, and at the same time the center differential is out of the restrained condition.

In one embodiment, the predetermined value of the vehicle deceleration is constant. In another embodiment, the control system further comprises means for sensing a coefficient of friction between at least one steerable wheel and a road surface, and the control means varies the predetermined value in accordance with the sensed coefficient of friction so that the function of the center differential is restrained at a lower deceleration when the coefficient of friction is low.

In the disclosed embodiments, the differential restraining means comprises a clutch and a solenoid valve. The clutch is disposed between a differential case and a side gear of the center differential, and operated by a fluid pressure. The solenoid valve operates the clutch by controlling the fluid pressure. The condition sensing means detects the condition of the center differential by monitoring the fluid pressure for operating the clutch.

BRIEF DESCRIPTION OF THE DRAWINGS

FIG. 6 is a block diagram of a control system of the second embodiment.

DETAILED DESCRIPTION OF THE INVENTION

Figure 2:
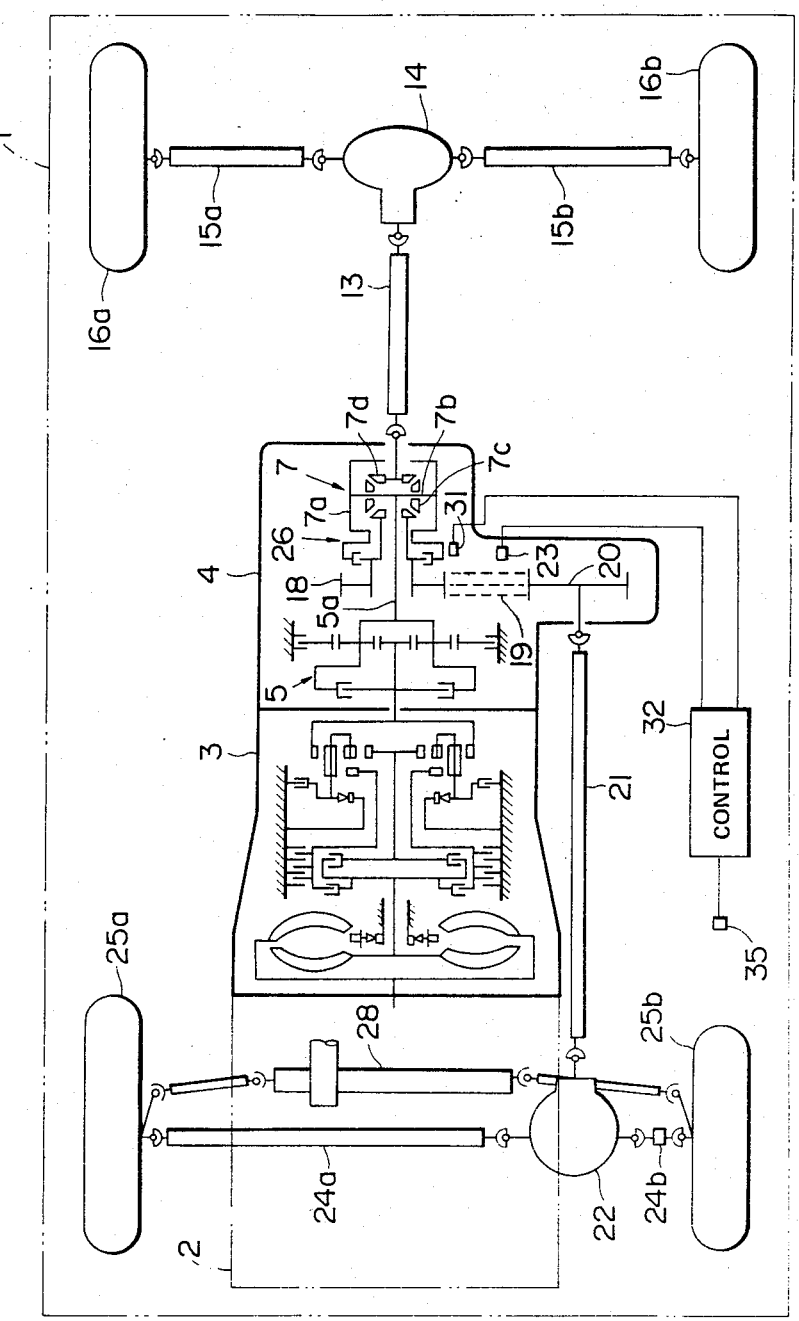
FIG. 2 is a schematic view of a four-wheel drive vehicle of a first embodiment of the present invention.

A first embodiment of the present invention is shown in FIG. 2. An engine 2 is supported on a vehicle body 1. The engine is connected to a main transmission 3. The main transmission 3 is connected to a secondary transmission 4. The secondary transmission 4 has a high-low two-speed change unit 5. The main transmission 3 is connected to the high-low change unit 5 of the secondary transmission 4. The high-low change unit 5 has an output shaft 5a. The secondary transmission 4 further has a center differential unit 7. The output shaft 5a of the high-low unit 5 is connected to the center differential unit 7. The center differential unit 7 has a differential case 7a, a pinion shaft 7b fixed to the differential case 7a, two differential pinions 7c rotatably mounted on the pinion shaft 7b, and first and second side gears 7d which mesh with the differential pinions 7c. The first side gear 7d is connected to one end of a rear propeller shaft 13. The other end of the rear propeller shaft 13 is connected with a rear differential unit 14. The rear differential unit 14 is connected to rear wheels 16a and 16b through rear axle shafts 15a and 15b. The rear differential unit 14 allows the right and left rear wheels 16a and 16b to rotate at different speeds, and thereby absorbs a rotational speed difference between the right and left rear wheels 16a and 16b.

The second side gear 7d of the center differential unit 7 is connected with a first chain wheel 18 placed coaxially with the second side gear 7d. The first chain wheel 18 is connected with a second chain wheel 20 by a chain belt 19. A shaft of the second chain wheel 20 is connected with one end of a front propeller shaft 21. The other end of the front propeller shaft 21 is connected to a front differential unit 22. The front differential unit 22 is connected with front wheels 25a and 25b through front axles 24a and 24b, respectively. The front differential unit 22 allows the right and left front wheels 25a and 25b to rotate at different speeds, and thereby absorbs a rotational speed difference between the right and left front wheels 25a and 25b.

Figure 3:
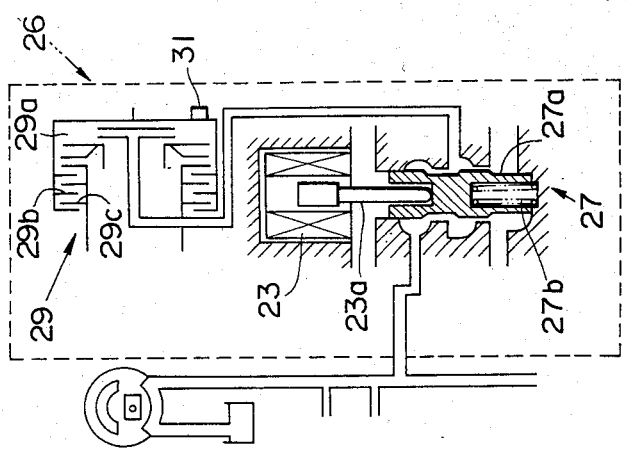
FIG. 3 is a fragmentary sectional schematic view of a center differential restraining means used in the vehicle of FIG. 2.

The secondary transmission 4 further has a center differential restrain unit 26 disposed between the differential case 7a of the center differential unit 7 and the first chain wheel 18. As shown in FIG. 3, the center differential restrain unit 26 has a center differential control valve 27 connected with a hydraulic system of the vehicle such as the hydraulic system of the transmission 3. The center differential control valve 27 has a spool 27a and a spring 27b. The center differential restrain unit 26 has a solenoid 23 having an iron core 23a for moving the spool 27a against the force of the spring 27b. The solenoid 23 serves as an actuator of a control system. The center differential restrain unit 26 further has a hydraulic type multiple disc clutch 29. The clutch 29 is operated by an oil pressure of an oil chamber 29a. The oil chamber 29a is fluidly connected with a port of the center differential control valve 27. The multiple disc clutch 29 has a group of first clutch plates 29b and a group of second clutch plates 29c. One of the two groups is connected with the differential case 7a of the center differential unit 7. The other is connected with the first chain wheel 18. The center differential control valve 27 can move the spool 27a with the iron core 23a in accordance with the current passing through the solenoid 23, and thereby control the fluid pressure in the oil chamber 29a by controlling the fluid flow. The clutch 29 is frictionally engaged with the oil pressure in the oil chamber 29a is high. The clutch 29 is in a slipping state when the oil pressure in the oil chamber 29a is low. The clutch 29 is disengaged when the oil is drained from the oil chamber 29a.

The vehicle further has a steering mechanism or means 28 connected with the steerable front wheels 25a and 25b. The steering mechanism 28 is moved by a steering wheel of the vehicle (not shown).

There is further provided a sensor 31 for detecting the condition of the center differential 7. In this embodiment, the differential condition sensor 31 detects whether the clutch 29 is engaged or not by monitoring the oil pressure in the oil chamber 29a.

There is further provided a sensor (G sensor) 35, mounted on the vehicle body 1, for sensing the deceleration of the vehicle.

Figure 4:
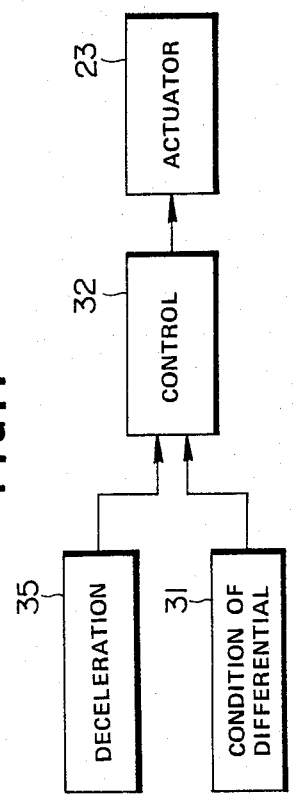
FIG. 4 is a block diagram of a control system of the first embodiment.

A control unit or circuit 32 is connected with the differential condition sensor 31 and the deceleration sensor 35 for receiving signals from both of the sensors 31 and 35. The control circuit 32 produces a control signal in accordance with the signals of both sensors, and send the control signal to the solenoid (actuator) 23. Thus, a control system is formed as shown in FIG. 4.

Figure 1:
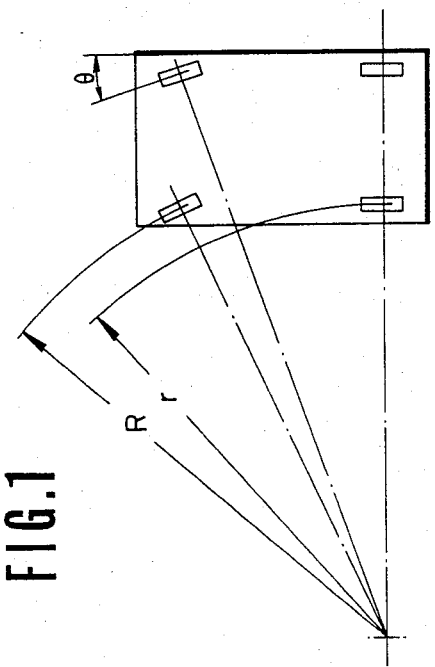
FIG. 1 is a plan view of a vehicle, for showing a turning radius difference between front wheels and rear wheels when steering angles of steerable wheels are large.

When the center differential restrain unit 26 is not actuated, the center differential unit 7 works in the following manner. When the steering angles θ of the steerable front wheels 25a and 25b are increased, the radii (R) of arc-shaped paths traveled by the front wheels 25a and 25b become largely different from the radii (r) of arc-shaped paths traveled by the rear wheels 16a and 16b, as shown in FIG. 1. In FIG. 1, only the paths of the inside front and rear wheels are shown. Consequently, there arises a large difference between the average rotation speed of the front wheels 25a and 25b and the average rotation speed of the rear wheels 16a and 16b. The center differential 7 in its released state absorbs this average rotation speed difference between the front and rear wheels, so that the vehicle can turn smoothly though the steering angles θ when they are large.

If the brakes are applied hard on the vehicle while the vehicle is running with the center differential 7 held in the released state, and the deceleration of the vehicle becomes equal to or higher than a predetermined value, the deceleration sensor 35 detects this condition and produces a signal. At the same time, the condition sensor 31 detects the fact that the clutch 29 is not engaged and the center different 7 is in the released state, and produces a signal. When both signals of the deceleration sensor 35 and the condition sensor 31 are inputted to the control unit 32, it sends its control signal to the actuator or solenoid 23 to command the center differential restrain unit 26 to prevent the function of the center differential 7. In response to the control signal, the current supply to the solenoid 23 is gradually increased, and accordingly the center differential control valve 27 increases the oil pressure in the oil chamber 29a by moving the spool 27a downwards in FIG. 3. When the oil pressure in the oil chamber 29a is increased, the clutch 29 is engaged, and prevents the action of the center differential 7. As a result, the front wheels 25a and 25b and the rear wheels 16a and 16b are forced to rotate integrally by the drive system. Therefore, during a hard stop, the front and rear wheels are forced to stop rotating at the same time, so that the excellent braking performance can be obtained without need of driver's manual operation.

Figure 5:
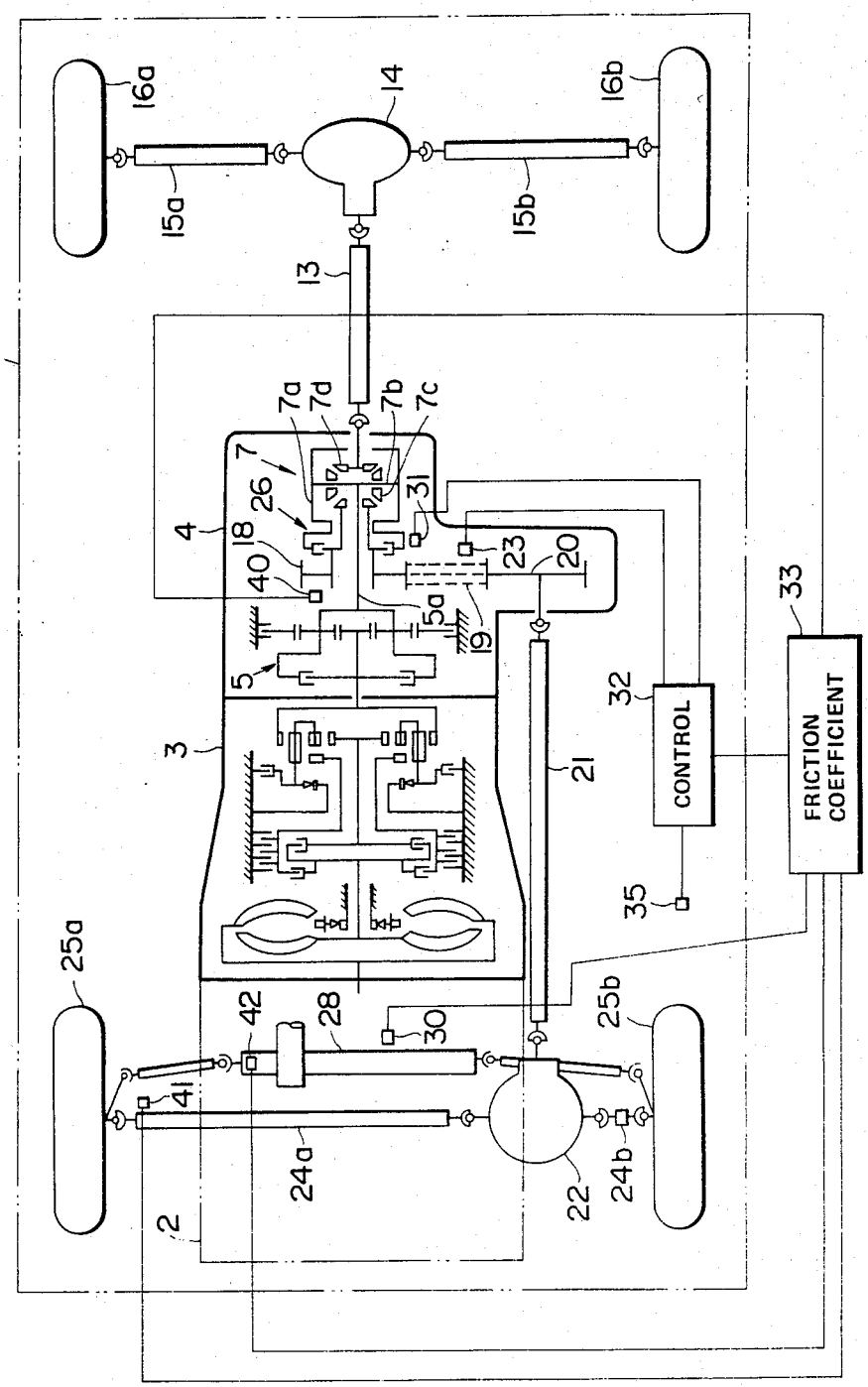
FIG. 5 is a schematic view of a four-wheel drive vehicle of a second embodiment of the present invention.

A second embodiment of the present invention is shown in FIGS. 5 and 6. In addition to the deceleration sensor 35 and the differential condition sensor 31, the control system of the second embodiment has a means for sensing a coefficient of friction between a road surface and at least one tire. When the coefficient of friction between the tires and road surface is low, the frictional braking force of the vehicle is reduced, and accordingly the braking effectiveness is reduced. The control system of the second embodiment is arranged to vary the predetermined value of the deceleration in accordance with the coefficient of friction so as to improve the braking effectiveness. As shown in FIG. 5, the four-wheel drive vehicle of this embodiment is provided with a steering angle sensor 30 mounted on the vehicle body 1 near the steering mechanism 28. The steering angle sensor 30 senses steering angles of the steerable wheels 25a and 25b by sensing the movement of the steering mechanism 28. A vehicle speed sensor 40 is mounted on the vehicle body 1 near the output shaft 5a of the high-low speed change unit 5. The vehicle speed sensor 40 senses the vehicle speed by sensing the rpm of the output shaft 5a. A normal load sensor 41 is mounted on the vehicle body 1 near the steerable front wheel 25a. The normal load sensor 41 senses, by estimate, a force acting in a vertical direction on the contact surface between the tire of the front wheel 25a and the road. A steering force sensor 42 is disposed in the steering means 28. The steering force sensor 42 senses a steering force produced by the movement of the steering wheel of the vehicle. There is further provided a friction coefficient calculating unit 33. As shown in FIG. 6, the friction coefficient calculating unit 33 is connected with the steering angle sensor 30, the vehicle speed sensor 40, the normal load sensor 41 and the steering force sensor 42 so as to receive signals from these sensors. From the signals of these sensors 30, 40, 41 and 42, the friction coefficient calculating unit 33 calculates the coefficient of friction between the tire of the steerable wheel 25a and road surface.

The coefficient of friction between the tire and road surface can be calculated in the following manner. The following is an equation (quoted from Jidosha Kogaku Hand Book (Automotive Engineers' Hand Book) compiled by Society of Automotive Engineers of Japan, 1981, p. 8–16) for obtaining a moment M which rotates or tends to rotate a steerable wheel of a moving vehicle about its kingpin.

$M = N \sin \zeta \sin \phi e \, (r + Rw \sin \zeta \cos \phi e)$
$+ S \, Rw \sin \zeta \sin \phi e \cos \zeta + S \, Xs \cos \zeta$
$+ N \, f \, r \cos \zeta$ In this equation, N is a load acting in a vertical direction on a contact surface between the tire of the steerable wheel (25a) and the road, r is a scrub radius, Rw is an effective radius of the tire, S is a force (side force) acting in a horizontal direction perpendicular to a direction of tire movement in the tire to road contact surface, Xs is expressed by $Xs = Tsat/S$ wherein Tsat is a self aligning torque, f is the coefficient of friction between the tire of the steerable wheel (25a) and road surface, $\zeta$ is expressed by $\tan^2 \zeta = \tan^2 \delta + \tan^2 \beta$ where $\delta$ is a kingpin inclination (steering axis inclination), and $\beta$ is a caster angle, and $\phi e$ is a steering angle of the steerable wheel (25a).

In this equation, r and Rw are quantities which are determined from the make (the specifications) of the vehicle. The quantity $\zeta$ is also known because $\delta$ and $\beta$ are determined by the make of the vehicle. The moment M is a quantity which is known from the steering force, so that the moment M can be determined by sensing the steering force. The load N is determined by the normal load sensor 41. The side force S is given by $S = Nfs$ where fs is a coefficient of a sidewise sliding friction. The coefficient fs is a quantity varying with the vehicle speed, so that an approximate value of the side force S can be determined by the values sensed by the normal load sensor 41 and the vehicle speed sensor 40. The self aligning torque Tsat is known from the make of the vehicle and the steering angle of the steerable wheel (25a). Therefore, an approximate value of Xs can be determined by sensing the steering angle of the steerable wheel, the vehicle speed, and the normal load. Finally, only the coefficient of friction f between the tire and road surface remain unknown in the above equation. Therefore, the friction coefficient calculating unit 33 is arranged to determine an approximate value of the coefficient of friction f between the tire and road surface from the signals from the steering angle sensor 30, the vehicle speed sensor 40, the normal load sensor 41 and the steering force sensor 42. The friction coefficient calculating unit 33 sends a signal indicative of the result of the calculation to the control unit 32.

Upon receipt of the signal of the friction coefficient calculating unit 33, the control unit 32 determines a value of the vehicle deceleration in accordance with the coefficient of friction determined by the friction coefficient calculating unit 33, and then, stores the determined value. The control unit 33 determines the value of the deceleration so that the value of the deceleration is low when the coefficient of friction determined by the friction coefficient sensing means is low. If the control unit 32 receives the signals from the deceleration sensor 35 and the condition sensor 31, and determines that the sensed deceleration of the vehicle is equal to or higher than the value of the deceleration determined and stored by the control unit 32, and at the same time the clutch 29 of the center differential restrain unit 26 is not engaged, then the control unit 32 sends the control signal to the solenoid 23 to actuate the center differential restrain unit 26 to engage the clutch 29. Thus, the control system of this embodiment can improve the braking performance even when the coefficient of friction between the tire and road surface is low.

What is claimed is:

1. A four-wheel drive vehicle having front and rear wheels and an engine, said vehicle comprising;
    (a) a four-wheel drive system for transmitting power from the engine to the front wheels and the rear wheels, said four-wheel drive system comprising;
        (i) a center differential connected between the front wheels and the rear wheels for absorbing a rotational speed difference between the front wheels and the rear wheels, and
        (ii) differential restraining means capable of bringing said center differential into a restrained condition in which the function of said center differential is restrained, and
    (b) a control system comprising
        (i) deceleration sensing means for sensing the deceleration of the vehicle,
        (ii) condition sensing means for detecting whether said center differential is in or out of said restrained condition, and
        (iii) control means, connected with said deceleration sensing means and said condition sensing means, for controlling said center differential by actuating said differential restraining means in accordance with signals of said deceleration and condition sensing means, said control means being arranged to actuate said differential restraining means to bring said center differential into said restrained condition if the sensed deceleration of the vehicle is equal to or higher than a predetermined value, and at the same time said center differential is out of said restrained condition.

2. A four-wheel drive vehicle according to claim 1, wherein said center differential comprises a front-side rotating member connected to the front wheels for driving the front wheels and a rear-side rotating member connected to the rear wheels for driving the rear wheels, said center differential being capable of allowing said front-side and rear-side rotating members to rotate at different speeds, wherein said differential restraining means is capable of holding said center differential in a locked condition included in said restrained condition, said front-side and rear-side rotating members being prevented from rotating at different speeds in said locked condition, wherein said condition sensing means detects whether said center differential is in or out of said locked condition, and wherein said control means is arranged to actuate said differential restraining means to bring said center differential into said locked condition if the sensed deceleration of the vehicle is equal to or higher than the predetermined value, and at the same time said center differential is out of said locked condition.

3. A four-wheel drive vehicle according to claim 2, wherein said differential restraining means comprises a clutch operated by a fluid pressure, said clutch holding said center differential in said locked condition when said clutch is engaged.

4. A four-wheel drive vehicle according to claim 3, wherein said condition sensing means detects the condition of said center differential by monitoring the fluid pressure for operating said clutch.

5. A four-wheel drive vehicle according to claim 4, wherein said clutch is engaged by increasing the fluid pressure and disengaged by decreasing the fluid pressure, said differential restraining means further comprising actuating means capable of increasing and decreasing the fluid pressure, said control means being arranged to command said actuating means to increase the fluid pressure if the sensed deceleration of the vehicle is equal to or higher than the predetermined value, and at the same time said center differential is out of said locked condition.

6. A four-wheel drive vehicle according to claim 5, wherein said clutch has a slip condition in which said clutch is slippingly engaged.

7. A four-wheel drive vehicle according to claim 6, wherein said front-side and rear-side rotating members of said center differential are side gears, said center differential further comprising a differential case, and differential pinion gears which are mounted in said differential case and mesh with said side gears, said clutch being provided between said differential case and said front-side rotating member.

8. A four-wheel drive vehicle according to claim 7, wherein said four-wheel drive system further comprises a front differential disposed between the right and left front wheels, and a rear differential disposed between the right and left rear wheels.

9. A four-wheel vehicle according to claim 8, wherein said actuating means comprises a solenoid valve.

10. A four-wheel drive vehicle according to claim 1, wherein said control means further comprises friction coefficient sensing means for sensing a coefficient of friction between a road surface and a tire of at least one of the wheels of the vehicle, said control means being connected with said friction coefficient sensing means to receive a signal therefrom, said control means determining the predetermined value of the deceleration in accordance with the sensed coefficient of friction so that the predetermined value which said control means determines when the sensed coefficient of friction is at a low level is lower than the predetermined value which said control means determines when the sensed coefficient of friction is at a high level highter than the low level.

11. A four-wheel drive vehicle according to claim 10, wherein said control means decreases the predetermined value as the coefficient of friction decreases.

12. A four-wheel drive vehicle according to claim 11, wherein said friction coefficient sensing means comprises steering angle sensing means for sensing a steering angle of at least one steerable wheel, vehicle speed sensing means for sensing the speed of the vehicle, load sensing means for sensing a force acting vertically on a contact surface between a road and the tire of the steerable wheel, and steering force sensing means for sensing a steering force.

13. A four-wheel drive vehicle according to claim 12, wherein said friction coefficient sensing means further comprises friction coefficient calculating means connected with said steering angle sensing means, said vehicle speed sensing means, said load sensing means and said steering force sensing means, for calculating the coefficient of friction between a road surface and at least one steerable wheel of the vehicle from the steering angle of the steerable wheel, the vehicle speed, the load and the steering force sensed by these sensing means.

* * * * *